United States Patent
Riviere et al.

(10) Patent No.: US 11,216,646 B1
(45) Date of Patent: Jan. 4, 2022

(54) TECHNIQUES FOR OBJECT APPEARANCE CAPTURE

(71) Applicant: DISNEY ENTERPRISES, INC., Burbank, CA (US)

(72) Inventors: Jeremy Riviere, Zurich (CH); Paulo Urnau Gotardo, Zurich (CH); Abhijeet Ghosh, Orbington (GB); Derek Edward Bradley, Zurich (CH); Dominik Thabo Beeler, Egg (CH)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/920,344

(22) Filed: Jul. 2, 2020

(51) Int. Cl.
*H04N 5/225* (2006.01)
*H04N 5/247* (2006.01)
*G06K 9/00* (2006.01)

(52) U.S. Cl.
CPC ..... *G06K 9/00255* (2013.01); *G06K 9/00275* (2013.01); *H04N 5/2256* (2013.01); *H04N 5/247* (2013.01)

(58) Field of Classification Search
CPC ........... G06K 9/00255; G06K 9/00275; H04N 5/2256; H04N 5/247
See application file for complete search history.

(56) References Cited

U.S. PATENT DOCUMENTS

| | | | |
|---|---|---|---|
| 8,670,606 B2 | 3/2014 | Beeler et al. | |
| 9,036,898 B1 * | 5/2015 | Beeler | G06T 7/246 |
| | | | 382/154 |
| 2006/0227137 A1 * | 10/2006 | Weyrich | G06T 15/50 |
| | | | 345/426 |
| 2009/0226049 A1 * | 9/2009 | Debevec | G06K 9/00221 |
| | | | 382/118 |
| 2012/0268571 A1 * | 10/2012 | Debevec | G06T 7/586 |
| | | | 348/48 |
| 2016/0261850 A1 * | 9/2016 | Debevec | H04N 13/254 |

(Continued)

OTHER PUBLICATIONS

Agarwal et al., "Ceres Solver", Retreived from http://ceres-solver.org. on Aug. 8, 2020, 2016, 1 page.

(Continued)

*Primary Examiner* — Francis Geroleo
(74) *Attorney, Agent, or Firm* — Artegis Law Group, LLP

(57) ABSTRACT

Techniques are disclosed for capturing facial appearance properties. In some examples, a facial capture system includes light source(s) that produce linearly polarized light, at least one camera that is cross-polarized with respect to the polarization of light produced by the light source(s), and at least one other camera that is not cross-polarized with respect to the polarization of the light produced by the light source(s). Images captured by the cross-polarized camera(s) are used to determine facial appearance properties other than specular intensity, such as diffuse albedo, while images captured by the camera(s) that are not cross-polarized are used to determine facial appearance properties including specular intensity. In addition, a coarse-to-fine optimization procedure is disclosed for determining appearance and detailed geometry maps based on images captured by the cross-polarized camera(s) and the camera(s) that are not cross-polarized.

19 Claims, 6 Drawing Sheets
(2 of 6 Drawing Sheet(s) Filed in Color)

(56) References Cited

U.S. PATENT DOCUMENTS

2017/0024921 A1* 1/2017 Beeler .................... G06T 13/40
2017/0154463 A1 6/2017 Von Cramon
2020/0020149 A1 1/2020 Moltaji et al.

OTHER PUBLICATIONS

Beeler et al., "High-Quality Single-Shot Capture of Facial Geometry", http://doi.acm.org/10.1145/1778765.1778777, ACM Transactions on Graphics, vol. 29, No. 4, Article 40, Jul. 2010, pp. 40:1-40:9.
Beeler et al., "High-Quality Passive Facial Performance Capture using Anchor Frames", http://doi.acm.org/10.1145/1964921.1964970, ACM Transactions on Graphics, vol. 30, No. 4, Article 75, Jul. 2011, pp. 75:1-75:10.
Bradley et al., "High Resolution Passive Facial Performance Capture", http://doi.acm.org/10.1145/1778765.1778778, ACM Transactions on Graphics, vol. 29, No. 4, Article 41, Jul. 2010, pp. 41:1-41:10.
Cao et al., "Real-Time High-Fidelity Facial Performance Capture", DOI: http://dx.doi.org/10.1145/2766943, ACM Transactions on Graphics, vol. 34, No. 4, Article 46, Aug. 2015, pp. 46:1-46:9.
Debevec et al., "Acquiring the Reflectance Field of a Human Face", In Proceedings of the 27th annual conference on Computer graphics and interactive techniques, ACM Press/Addison-Wesley Publishing Co., ACM, 2000, pp. 145-156.
D'eon et al., "Efficient Rendering of Human Skin", In Proceedings of the 18th Eurographics Conference on Rendering Techniques (EGSR'O'I), Eurographics Association, 2007, pp. 147-157.
Donner et al., "Light Diffusion in Multi-Layered Translucent Materials", ACM Transaction on Graphics (TOG), vol. 24, No. 3, 2005, pp. 1032-1039.
Fyffe et al., "Single-Shot Reflectance Measurement from Polarized Color Gradient Illumination", In International Conference on Computational Photography (ICCP), IEEE, 2015, 10 pages.
Fyffe et al., "Near-Instant Capture of High-Resolution Facial Geometry and Reflectance", Computer Graphics Forum (CGF), DOI: 10.1111/cgf.12837, vol. 35, No. 2, 2016, pp. 353-363.
Fyffe et al., "Comprehensive Facial Performance Capture", DOI: 10.1111/j.1467-8659.2011.01888.x, Computer Graphic Forum (CGF), vol. 30, No. 2, 2011, pp. 425-434.
Fyffe et al., "Driving High-Resolution Facial Scans with Video Performance Capture", DOI: http://dx.doi.org/10.1145/2638549, ACM Transactions on Graphics, vol. 34, No. 1, Article 8, Nov. 2014, pp. 8:1-8:14.
Garrido et al., "Reconstructing Detailed Dynamic Face Geometry from Monocular Video", DOI: http://doi.acm.org/10.1145/2508363.2508380, ACM Transactions on Graphics, vol. 32, No. 6, Article 158, Nov. 2013, pp. 158:1-158:10.
Ghosh et al., "Multiview Face Capture using Polarized Spherical Gradient Illumination", http://doi.acm.org/10.1145/2024156.2024163, ACM Transactions on Graphics, vol. 30, No. 6, Article 129, Dec. 2011, pp. 129:1-129:10.
Ghosh et al., "Practical Modeling and Acquisition of Layered Facial Reflectance", http://doi.acm.org/10.1145/1409060.1409092, ACM Transactions on Graphics, vol. 27, No. 5, Article 139, Dec. 2008, pp. 139:1-139:10.
Gotardo et al., "Practical Dynamic Facial Appearance Modeling and Acquisition", https://doi.org/10.1145/3272127.3275073, ACM Trans. Graph., vol. 37, No. 6, Article 232, Nov. 2018, pp. 232:1-232:13.
Gotardo et al., "Photogeometric Scene Flow for High-Detail Dynamic 3D Reconstruction", In IEEE International Journal of Computer Vision, IEEE, 2015, pp. 846-854.
Graham et al., "Measurement-Based Synthesis of Facial Microgeometry", DOI: 10.1111/cgf.12053, Computer Graphics Forum (CGF), vol. 32, No. 2, 2013, pp. 335-344.
Hawkins et al., "Animatable Facial Reflectance Fields", Eurographics Symposium on Rendering, 2004, 12 pages.
Huynh et al., "Mesoscopic Facial Geometry Inference Using Deep Neural Networks", In IEEE International Conference on Computer Vision and Pattern Recognition (CVPR), IEEE, 2018, pp. 8407-8416.
Ichim et al., "Dynamic 3D Avatar Creation from Hand-held Video Input", DOI: http://dx.doi.org/10.1145/2766974, ACM Transactions on Graphics, vol. 34, No. 4, Article 45, Aug. 2015, pp. 45:1-45:14.
Jensen et al., "A Practical Model for Subsurface Light Transport", In Proceedings of ACM SIGGRAPH, ACM, 2001, pp. 511-518.
Kampouris et al., "Diffuse-Specular Separation using Binary Spherical Gradient Illumination", In Proceedings of the Eurographics Symposium on Rendering: Experimental Ideas & Implementations, https://doi.org/10.2312/sre.20181167, 2018, pp. 1-10.
Klehm et al., "Recent Advances in Facial Appearance Capture", DOI: 10.1111/cgf.12594, Computer Graphics Forum, (CGF), vol. 34, No. 2, May 2015, pp. 709-733.
Ma et al., "Rapid Acquisition of Specular and Diffuse Normal Maps from Polarized Spherical Gradient Illumination", In Proceedings of the 18th Eurographics Conference on Rendering Techniques (EGSR'07), Eurographics Association, 2007, pp. 183-194.
Ma et al., "Facial Performance Synthesis using Deformation-Driven Polynomial Displacement Maps", http://doi.acm.org/10.1145/1409060.1409074, ACM Transactions on Graphics, vol. 27, No. 5, Article 121, Dec. 2008, pp. 121:1-121:10.
Meka et al., "Deep Reflectance Fields: High-Quality Facial Reflectance Field Inference from Color Gradient Illumination", https://doi.org/101145/3306346.3323027, ACM Trans. Graph., vol. 38, No. 4, Article 77, Jul. 2019, pp. 77:1-77:12.
Nagano et al., "Skin Microstructure Deformation with Displacement Map Convolution", DOI: http://doi.acm.org/10.1145/2766894, ACM Transactions on Graphics, vol. 34, No. 4, Article 109, Aug. 2015, pp. 109:1-109:10.
Nehab et al., "Efficiently Combining Positions and Normals for Precise 3D Geometry", In ACM Transactions on Graphics, vol. 24, 2005, pp. 536-543.
Pharr et al., "Physically Based Rendering", From Theory to Implementation (3rd Edition), Morgan Kaufmann Publishers Inc., San Francisco, CA, USA, 2016, 1266 pages.
Saito et al., "Photorealistic Facial Texture Inference Using Deep Neural Networks", DOI 10.1109/CVPR.2017.250, In Proceedings of IEEE Conference on Computer Vision and Pattern Recognition (CVPR), IEEE, 2017, pp. 2326-2335.
Shi et al., "Automatic Acquisition of High-fidelity Facial Performances Using Monocular Videos", DOI: http://doi.acm.org/10.1145/2661229.2661290, ACM Transactions on Graphics, vol. 33, No. 6, Article 222, Nov. 2014, pp. 222:1-222:13.
Valgaerts et al., "Lightweight Binocular Facial Performance Capture under Uncontrolled Lighting", http://doi.acm.org/10.1145/2366145.2366206, ACM Transactions on Graphics, vol. 31, No. 6, Article 187, Nov. 2012, pp. 187:1-187:11.
Walter et al., "Microfacet Models for Refraction through Rough Surfaces", In Proceedings of the 18th Eurographics Conference on Rendering Techniques, Eurographics Association, 2007, 12 pages.
Wenger et al., "Performance Relighting and Reflectance Transformation with Time-Multiplexed Illumination", ACM Transactions on Graphics, vol. 24, No. 3, 2005, pp. 756-764.
Weyrich et al., "Principles of Appearance Acquisition and Representation", DOI: 10.1561/0600000022, Foundations and Trends, Computer Graphics and Vision, vol. 4, No. 2, 2008, pp. 75-191.
Weyrich et al., "Analysis of Human Faces using a Measurement-Based Skin Reflectance Model", ACM Transactions on Graphics, vol. 25, No. 3, Jul. 2006, pp. 1013-1024.
Wilson et al., "Temporal Upsampling of Performance Geometry Using Photometric Alignment", DOI 10.1145/1731047.1731055, ACM Transactions on Graphics, vol. 29, No. 2, Article 17, Mar. 2010, pp. 17:1-17:11.
Yamaguchi et al., "High-Fidelity Facial Reflectance and Geometry Inference From an Unconstrained Image", https://doi.org/10.1145/3197517.3201364, ACM Trans. Graph., vol. 37, No. 4, Article 162, Aug. 2018, pp. 162:1-162:14.

(56) References Cited

OTHER PUBLICATIONS

GB Search Report for application No. 2109406.5 dated Oct. 28, 2021.

* cited by examiner

TECHNIQUES FOR OBJECT APPEARANCE CAPTURE

BACKGROUND

Technical Field

Embodiments of the present disclosure relate generally to computer science and computer graphics and, more specifically, to techniques for facial appearance capture.

Description of the Related Art

Realistic digital faces are required for various computer graphics and computer vision applications. For example, digital faces are oftentimes used in virtual scenes of film or television productions and in video games.

A digital face can be synthesized using three-dimensional (3D) geometry of the face and two-dimensional (2D) appearance maps indicating reflectance properties of the face. As used herein, "appearance" refers to reflectance properties characterizing how light interacts with materials before reaching a camera. Example reflectance properties include, without limitation, shininess (also referred to as "specular intensity") and the shape of a specular reflection lobe (also referred to as "roughness"), which are surface properties of skin, as well shading-free color (also referred to as "diffuse albedo"), which is mostly a subsurface property but can include contributions from the surface of skin as well. The reflectance properties of human skin, and more particularly the skin on a face, can vary due to skin type, tanning, blood flow caused by muscle activation or physiological effects, scarring, stretching, oiliness, and sweating, among other things.

Facial capture systems have been used to capture images of individual faces, which can in turn be used to obtain the 3D geometry and appearance maps needed to synthesize digital faces. In order to capture photorealistic faces, a typical facial capture system employs a specialized light stage and hundreds of lights that are used to capture numerous images of an individual face under multiple illumination conditions. In practice, the different illumination conditions are strobed in quick succession using the lights of the facial capture system to minimize the negative effects introduced by any movements of the individual. Motion compensation techniques are sometimes applied to further compensate for movements of the individual.

One drawback of the above approach to capturing images of individual faces to create appearance maps is that the facial capture systems are complex and not portable, which limits the practical applicability of those systems. Another drawback is that strobing the lights of a facial capture system through different illumination conditions can be uncomfortable to the individual whose face is being captured. Further, using motion compensation techniques to compensate for the movements of an individual can reduce the overall quality of the facial capture results. In addition, typical facial capture systems permit only static facial capture, not dynamic facial capture from videos.

As the foregoing illustrates, what is needed in the art are more effective techniques for capturing faces.

SUMMARY

One embodiment of the present disclosure sets forth a computer-implemented method for generating one or more maps indicating surface properties of an object. The method includes receiving a first set of one or more images of the object captured using at least one first camera that is cross-polarized with respect to a polarization of at least one light source. The method further includes receiving a second set of one or more images of the object captured using at least one second camera that is not cross-polarized with respect to the polarization of the at least one light source. The method also includes receiving a three-dimensional (3D) geometry associated with the object. In addition, the method includes generating at least one of an appearance map or a geometry map associated with the object based on the first set of one or more images, the second set of one or more images, and the 3D geometry.

Another embodiment of the present disclosure sets forth a camera system. The camera system includes at least one light source configured to generate light that is polarized. The camera system further includes at least one first camera configured to capture light that is cross-polarized with respect to a polarization of the light generated by the at least one light source. In addition, the camera system includes at least one second camera configured to capture light that is not cross-polarized with respect to the polarization of the light generated by the at least one light source.

Other embodiments of the present disclosure include, without limitation, a computer-readable medium including instructions for performing one or more aspects of the disclosed techniques as well as a computing device for performing one or more aspects of the disclosed techniques.

At least one technical advantage of the disclosed techniques relative to the prior art is that the disclosed techniques can be used to generate high-quality appearance maps and detailed geometry maps, without requiring the specialized light stages and hundreds of lights typically associated with conventional facial capture systems. As a result, the disclosed technique provide ease of use and increased practical applicability relative to conventional facial capture systems. The disclosed techniques also permit single-shot capture, as opposed to multi-shot capture with strobed lighting, which reduces the discomfort to individuals whose faces are being captured. In addition, the disclosed techniques permit dynamic facial capture from videos. These technical advantages represent one or more technological improvements over prior art approaches.

BRIEF DESCRIPTION OF THE DRAWINGS

The patent or application file contains at least one drawing executed in color. Copies of this patent or patent application publication with color drawings will be provided by the Office upon request and payment of the necessary fee.

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
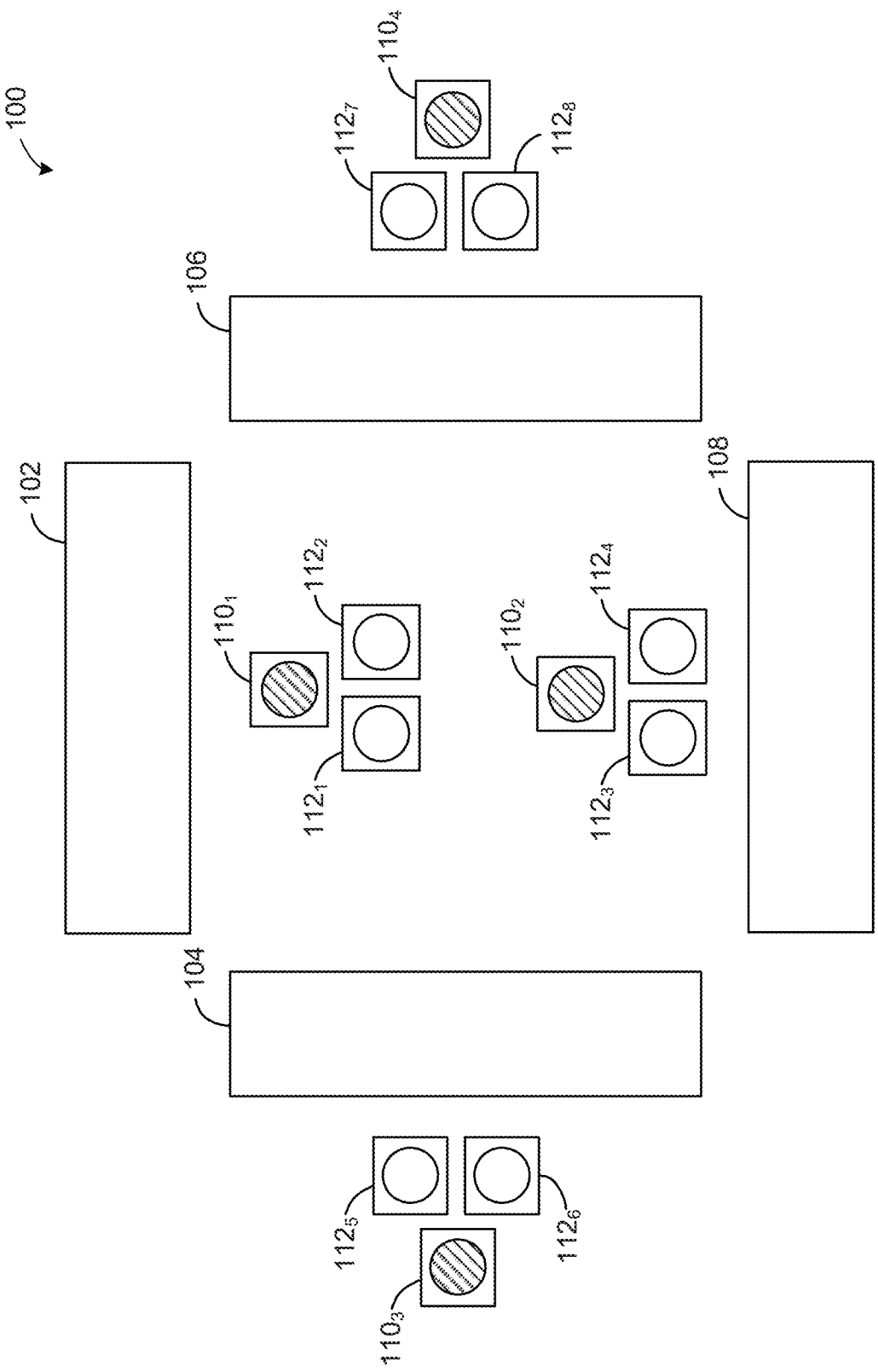
FIG. 1 illustrates the frontal view of a camera system for capturing faces of individuals, according to various embodiments.

FIG. 1 illustrates the frontal view of a camera system 100 for capturing faces of individuals, according to various embodiments. As shown, the camera system 100 includes light sources 102, 104, 106, and 108; cross-polarized cameras $110_{1-4}$ (collectively referred to herein as "cross-polarized cameras 110" and individually referred to herein as "a cross-polarized camera 110"), and cameras that are not cross-polarized $112_{1-8}$ (collectively referred to herein as "cameras that are not cross-polarized 112" and individually referred to herein as "a camera that is not cross-polarized 112").

In operation, the light sources 102, 104, 106, and 108 produce light having a particular polarization that is directed toward an individual who is seated in front of the camera system 100. In embodiments, the particular polarization can be any linear polarization (e.g., horizontal polarization or vertical polarization), circular polarization (e.g., left or right circular polarization), or elliptical polarization, and any technically-feasible light sources can be used. For example, the light sources 102, 104, 106, and 108 could include light-emitting diodes (LEDs) or studio flashes (e.g., a floor-standing light), with horizontal polarizing filters placed in front of the LEDs or studio flashes. In some embodiments, the linearly polarized light produced by the light sources 102, 104, 106, and 108 may be substantially uniform, i.e., light that is incident on a face from different directions (e.g., front, above, below, left, and right) and that does not have any patterns.

The cross-polarized cameras 110 capture light having a polarization orthogonal to the particular polarization of light produced by the light sources 102, 104, 106, and 108. For example, if light produced by the light sources 102, 104, 106, and 108 is horizontally polarized, then the cross-polarized cameras 110 may be configured to capture vertically polarized light, or vice versa. In such a case, the cross-polarized cameras 110 could be digital cameras (e.g., digital single-lens reflex (DSLR) cameras) with linear polarizing filters placed in front of the digital cameras and oriented to pass light having an orthogonal polarization to the linear polarization of light produced by the light sources 102, 104, 106, and 108. As another example, if light produced by the light sources 102, 104, 106, and 108 is left-circularly polarized (or left-handed elliptically polarized), then the cross-polarized cameras 110 may be configured to capture right-circularly polarized (or right-handed elliptically polarized) light, or vice versa. The cross-polarized cameras 110 are color cameras (as opposed to monochrome cameras) in some embodiments.

The cameras that are not cross-polarized 112 capture light produced by the light sources 102, 104, 106, and 108, including light that is not orthogonally polarized with respect to the particular polarization of light produced by the light sources 102, 104, 106, and 108. For example, the cameras that are not cross-polarized 112 could be unpolarized cameras that capture all of the light produced by the light sources 102, 104, 106, and 108. As another example, if light produced by the light sources 102, 104, 106, and 108 is horizontally polarized, then the cameras that are not cross-polarized 112 could be parallel-polarized cameras that capture the horizontally polarized light. In such cases, the parallel-polarized cameras may be parallel-polarized digital cameras (e.g., digital single-lens reflex (DSLR) cameras) with linear polarizing filters placed in front of the digital cameras and oriented to pass through horizontally polarized light from the light sources 102, 104, 106, and 108. Although some examples are described herein with respect to parallel-polarized cameras, it should be understood that techniques disclosed herein are also applicable to other types of cameras that are not cross-polarized with respect to light produced light sources. The cameras that are not cross-polarized 112 can either be monochrome (i.e., grayscale) cameras or color cameras in some embodiments.

Images captured by the cross-polarized cameras 110 do not include specular highlights, in contrast to images captured by the cameras that are not cross-polarized 112. As a result, the images captured by the cross-polarized cameras 110 can be used to determine appearance properties, such as diffuse albedo, that are caused by subsurface scattering. During subsurface scattering, light bounces under the skin and is absorbed by skin pigments before bouncing back out, which gives human skin a "soft" appearance. On the other hand, images captured by the cameras that are not cross-polarized 112 can be used to determine appearance properties including specular intensity and specular lobe. In contrast to subsurface scattering, specular intensity as well as the shape of specular lobes represents highlight caused by light reflecting from the surface of skin. Such highlights are white in color, assuming the light being reflected is white.

Because images captured by the cross-polarized cameras 110 and the cameras that are not cross-polarized 112 can be used separately to determine the non-specular and specular properties of a face, only one shot (i.e., exposure) is required using the cameras 110 and 112 to generate different appearance maps of the face, such as a diffuse albedo map indicating shading-free color, a specular map indicating shininess, and a detailed geometry map indicating either normals or displacements that can be used to add or emboss fine detailed 3D geometry onto an initial, coarse 3D geometry of the face. Strobing of lights to take multiple shots, which can be uncomfortable to an individual whose face is being captured, is not necessary. Rather than taking multiple shots using strobing in a time-multiplexed manner, the camera system 100 enables view multiplexing, in which only one shot is required, because the polarization of some views are different from the polarization of others.

As shown, the cross-polarized cameras 110 and the cameras that are not cross-polarized 112 are arranged as triplets of cameras, each of which includes a pair of cameras that are not cross-polarized 112 and one cross-polarized camera 110. In operation, one of the triplets of cameras can be used to capture a front of a face, another of the triplets of cameras can be used to capture a bottom of the face that includes the region under the chin as well as the chin itself and a region around the mouth, another of the triplets of cameras can be used to capture a left side of the face, and yet another of the triplets of cameras can be used to capture a right side of the face. Accordingly, the cross-polarized cameras 110 and the cameras that are not cross-polarized 112 provide full coverage of a face.

Images captured by the pairs of cameras that are not cross-polarized 112 can be used to determine an initial 3D geometry of a face using triangulation techniques. Alternatively, the initial 3D geometry may be obtained in any technically feasible manner. For example, the initial 3D geometry could be received from another facial capture system that uses a different set of cameras, a depth camera, or some other scanning system. The initial 3D geometry and images captured by the cross-polarized cameras 110 and the cameras that are not cross-polarized 112 can then be used to determine appearance maps, as well as a more detailed geometry map that includes fine wrinkles and pores of a face, as discussed in greater detail below in conjunction with FIGS. 3-6. Although the appearance maps and detailed geometry map are described separately herein, it should be understood that the detailed geometry map can itself be considered an appearance map. In some embodiments, the appearance maps can include an albedo map and a specular intensity map. Determining the appearance and detailed geometry maps is also referred to herein as determining appearance and detailed geometry parameter values, respectively, because the appearance and detailed geometry maps can be inserted, as parameter values, into a rendering equation that is used to render a face.

Although four triplets of cross-polarized cameras 110 and cameras that are not cross-polarized 112 are shown for illustrative purposes, other embodiments may employ one or more cross-polarized cameras and one or more cameras that are not cross-polarized, arranged in any suitable manner, depending on the amount of facial coverage and specular information that is desired. More cross-polarized cameras, more cameras that are not cross-polarized, or an equal number of cross-polarized cameras and cameras that are not cross-polarized may be used in embodiments. In addition, any of the cross-polarized cameras and the cameras that are not cross-polarized can be arranged inside the boundaries formed by light sources, outside those boundaries, or in any other technically feasible manner (e.g., if the light sources do not form a boundary). It should be understood that diffuse color remains constant when captured by cameras at different vantage points, but specular information can change when captured by cameras at different vantage points. For example, one cross-polarized camera and one camera that is not cross-polarized could be used if partial facial coverage and a limited amount of specular information is acceptable (e.g., if only part of the face needs to be reconstructed). As another example, fewer than four triplets of cross-polarized cameras and cameras that are not cross-polarized could be used if the cameras are wide-angle cameras. On the other hand, more than four triplets of cross-polarized cameras and cameras that are not cross-polarized may be used to provide redundancy. In addition, the cross-polarized cameras and cameras that are not cross-polarized can be separated from each, rather than placed together in triplets, so long as complementary image data is captured by the cross-polarized cameras and cameras that are not cross-polarized. However, pairs of cameras that are not cross-polarized should be close to each other if stereo reconstruction is required.

Figure 2:
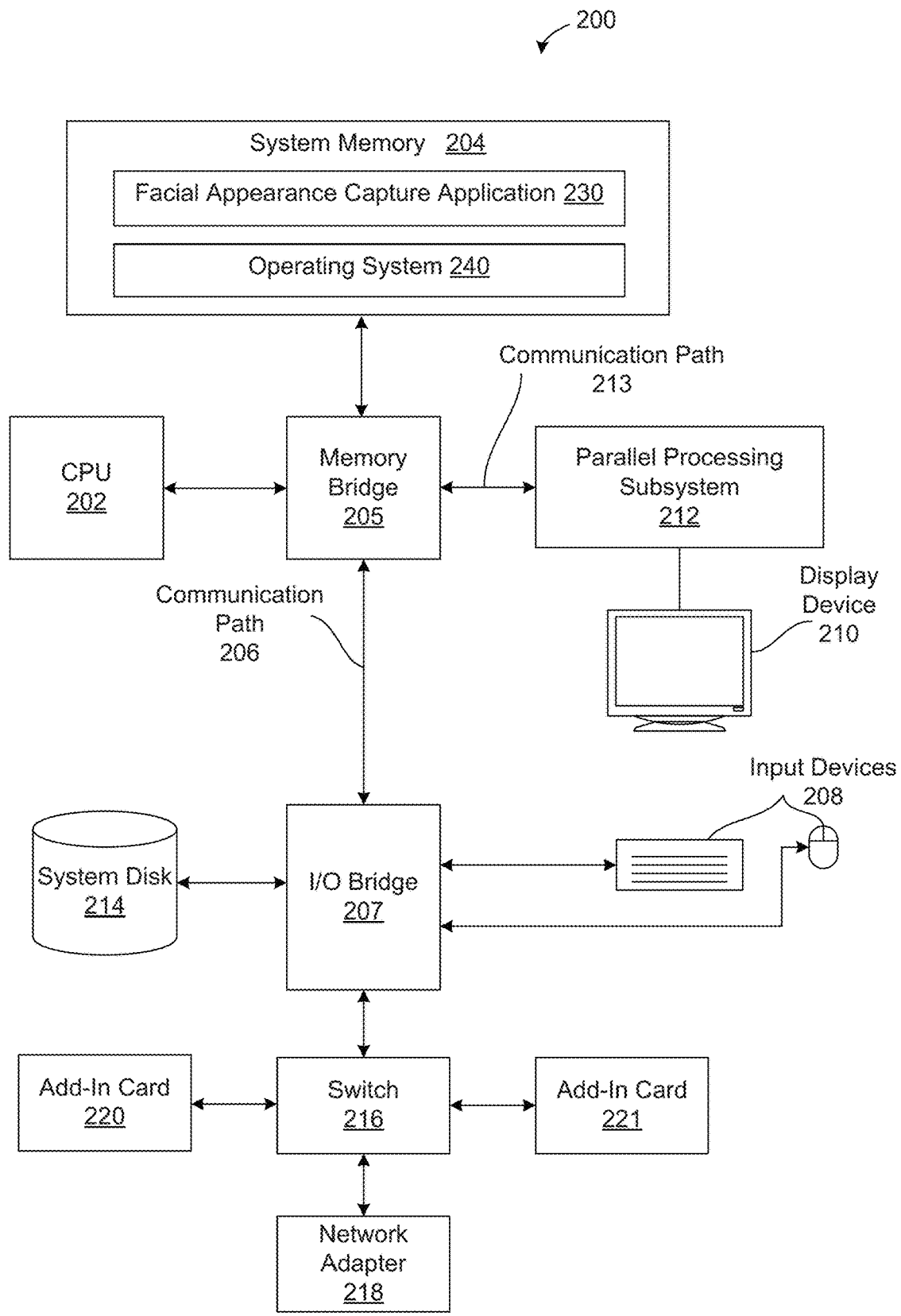
FIG. 2 illustrates a system configured to implement one or more aspects of the various embodiments.

FIG. 2 illustrates a system 200 configured to implement one or more aspects of the various embodiments. As shown, the system 200 includes, without limitation, a central processing unit (CPU) 202 and a system memory 204 coupled to one or more input devices 208, such as a keyboard, a mouse, a joystick, etc., and an I/O bridge 207 that is configured to forward the input information to the CPU 202 for processing via a communication path 206 and a memory bridge 205. A switch 216 is configured to provide connections between the I/O bridge 207 and other components of the system 200, such as a network adapter 218 and various add-in cards 220 and 221. Although two add-in cards 220 and 221 are illustrated, in some embodiments, the system 200 may not include any add-in cards or may only include a single add-in card, or the system 200 may include more than two add-in cards.

As also shown, the I/O bridge 207 is coupled to a system disk 214 that may be configured to store content, applications, and/or data for use by the CPU 202 and parallel processing subsystem 212. As a general matter, the system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 207 as well.

In various embodiments, the memory bridge 205 may be a Northbridge chip, and the I/O bridge 207 may be a Southbridge chip. In addition, communication paths 206 and 213, as well as other communication paths within the system 200, may be implemented using any technically suitable protocols, including, without limitation, AGP (Accelerated Graphics Port), HyperTransport, or any other bus or point-to-point communication protocol known in the art.

In some embodiments, the parallel processing subsystem 212 comprises a graphics subsystem that delivers pixels to a display device 210 that may be any conventional cathode ray tube, liquid crystal display, light-emitting diode display, or the like. In such embodiments, the parallel processing subsystem 212 incorporates circuitry optimized for graphics and video processing, including, for example, video output circuitry. Such circuitry may be incorporated across one or more parallel processing units (PPUs) included within the parallel processing subsystem 212. In other embodiments, the parallel processing subsystem 212 incorporates circuitry optimized for general purpose and/or compute processing. Again, such circuitry may be incorporated across one or more PPUs included within the parallel processing subsystem 212 that are configured to perform such general purpose and/or compute operations. In yet other embodiments, the one or more PPUs included within the parallel processing subsystem 212 may be configured to perform graphics processing, general purpose processing, and compute processing operations. The system memory 204 may include at least one device driver configured to manage the processing operations of the one or more PPUs within the parallel processing subsystem 212.

In various embodiments, the parallel processing subsystem 212 may be or include a graphics processing unit (GPU). In some embodiments, the parallel processing subsystem 212 may be integrated with one or more of the other elements of FIG. 2 to form a single system. For example, the parallel processing subsystem 212 may be integrated with the CPU 202 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, the system memory 204 could be connected to the CPU 202 directly rather than through the memory bridge 205, and other devices would communicate with the system memory 204 via the memory bridge 205 and the CPU 202. In other alternative topologies, the parallel processing subsystem 212 may be connected to the I/O bridge 207 or directly to the CPU 202, rather than to the memory bridge 205. In still other embodiments, the I/O bridge 207 and the memory bridge 205 may be integrated into a single chip instead of existing as one or more discrete devices. In some embodiments, any combination of the CPU 202, the parallel processing subsystem 212, and the system memory 204 may be replaced with any type of virtual computing system, distributed computing system, or cloud computing environment, such as a public cloud, a private cloud, or a hybrid cloud. Lastly, in certain embodiments, one or more components shown in FIG. 2 may not be present. For example, the switch 216 could be eliminated, and the network adapter 218 and add-in cards 220, 221 would connect directly to the I/O bridge 207.

Illustratively, the system memory 204 stores a facial appearance capture application 230 (also referred to herein as the "appearance capture application") and an operating system 240, on which the appearance capture application 230 runs. The operating system 240 may be, e.g., Linux®, Microsoft Windows®, or macOS®. In some embodiments, the appearance capture application 230 is configured to receive images of a face captured via the cross-polarized cameras 210 and the cameras that are not cross-polarized 112, as well an initial 3D geometry of the face. Given such inputs, the appearance capture application 230 performs an optimization to simultaneously compute high-quality appearance and detailed geometry maps, as discussed in greater detail below in conjunction with FIGS. 3 and 5-6. Performing optimizations is also referred to herein as performing one or more "optimization operations."

Figure 3:
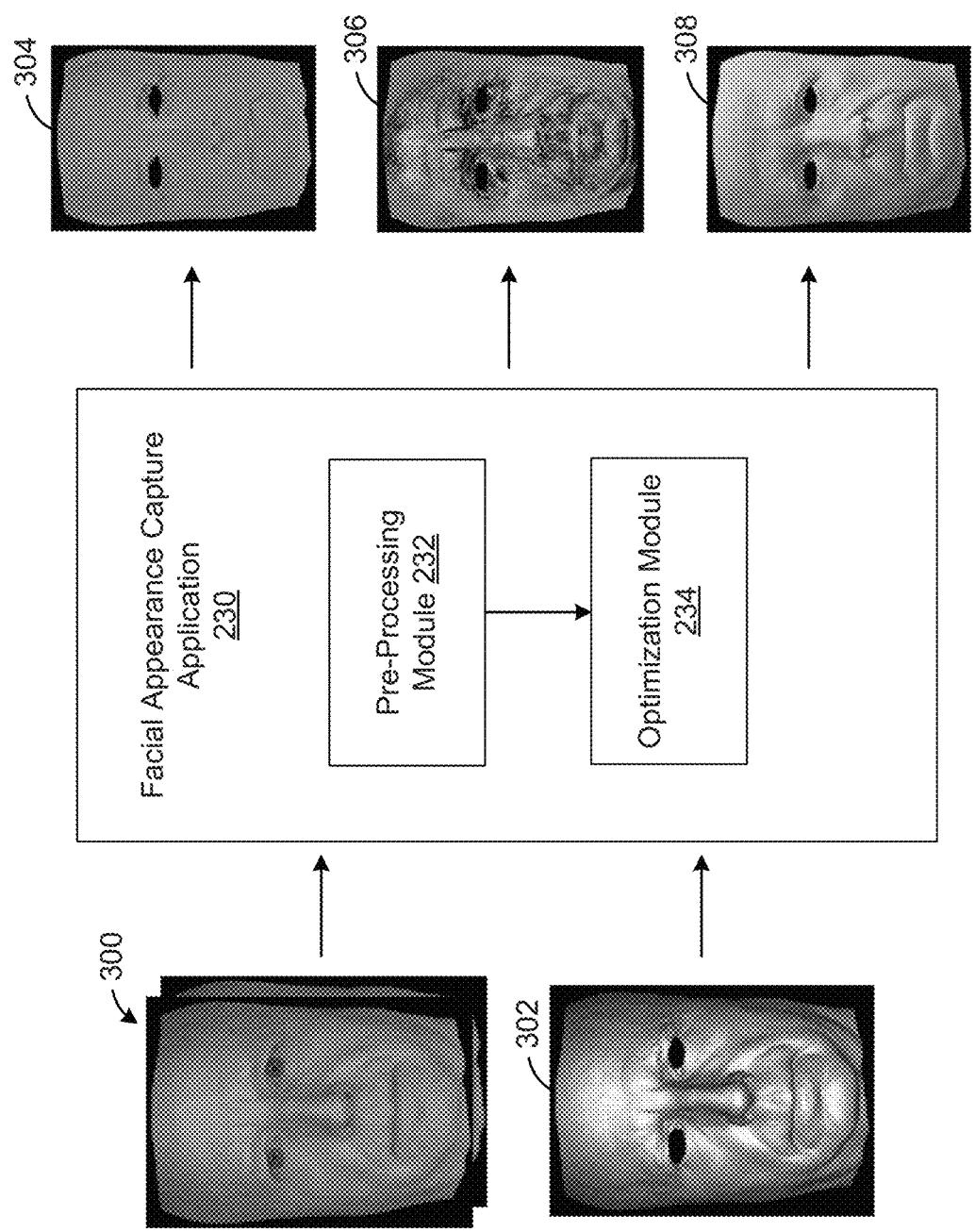
FIG. 3 is a more detailed illustration of the facial appearance capture application of FIG. 1, according to various embodiments.

FIG. 3 is a more detailed illustration of the facial appearance capture application 230 of FIG. 2, according to various embodiments. As shown, the appearance capture application 230 receives as inputs images 300 of a face captured using the cameras 110 and 112, as well as an initial 3D geometry 302 of the face. The initial 3D geometry 302 can be generated in any technically feasible manner, including using known stereo techniques such as those disclosed in U.S. Pat. No. 9,036,898, entitled "High-Quality Passive Performance Capture Using Anchor Frames," and U.S. Pat. No. 8,670,606, entitled "System and Method for Calculating an Optimization for a Facial Reconstruction Based on Photometric and Surface Consistency," which are entirely incorporated by reference herein in their entireties. Some stereo techniques output a two-dimensional (2D) representation of the 3D geometry, such as a displacement map defined in UV texture space. For example, a displacement map in UV texture space could be generated using automatic parameterization techniques, or by manually fitting a triangulated raw geometry to a template face mesh with a well-formed topology. It should be understood that the UV parametrization makes it easier to pool together data from different cameras (e.g., the cross-polarized cameras 110 and the cameras that are not cross-polarized 112) during appearance estimation.

As shown, the appearance capture application 230 includes a pre-processing module 232 and an optimization module 234. The pre-processing module 232 performs a calibration procedure to determine initial appearance maps that provide the starting point for optimization performed by the optimization module 234. Calibration is required to ensure that the images captured by different cameras 110 and 112 are compatible when used as optimization constraints. In some embodiments, the pre-processing module 232 performs calibration using (1) one of the cross-polarized cameras 110 as a calibration target for calibrating the other cross-polarized cameras 110, and (2) a rendering of the face captured by one of the cameras that are not cross-polarized 112 as the calibration target for calibrating the other cameras that are not cross-polarized 112. Such a calibration, which is referred to herein as "self calibration," differs from conventional calibration techniques that use a color chart as the calibration target. Experience has shown that self calibration can automatically compensate for light attenuation when passing through polarization filters, as well as mitigate the variability in responses of different cameras to incoming light. The outputs of self calibration are color-exposure correction matrices for each camera and initial albedo maps associated with each of the cameras 110 and 112. Initial specular intensity maps can be set to 0 or a typical specular intensity associated with faces.

In addition to the self calibration described above, positions of the cameras that are not cross-polarized 112 can be calibrated relative to each other to enable triangulation that is used to generate the initial 3D geometry 302. For example, the appearance capture application 230 could perform such a calibration if the appearance capture application 230 generates the initial 3D geometry 302 (rather than receiving the initial 3D geometry 302 as input). Lighting calibration can also be performed by capturing an image of a mirror ball in front of the camera system 100 and using reflections from the mirror ball to estimate the environmental lighting used to render images of a face that are compared with images of the face captured by the cross-polarized cameras 110 and cameras that are not cross-polarized 112, discussed in greater detail below. For example, the environmental lighting can be estimated as an environment map encoding a spatial distribution of incoming light from the light sources 102, 104, 106, and 108. In other embodiments, rather than looking inwards to a mirror ball, lighting calibration could be performed by stitching together panorama images captured with a fisheye lens from the point of view of a face looking outwards. In addition, the initial 3D geometry can be used to ray-trace shadow maps that can be used during optimization performed by the optimization module 234. The shadow maps indicate if particular lights source are visible by a particular point on a face. When performing appearance estimation, all of the light that arrives at each point on the face needs to be accumulated, but if a part/area of a light source is occluded (e.g. by the nose), as indicated by the shadow maps, then those directions are ignored.

In some embodiments, the pre-processing module 232 also generates an initial detailed geometry map. For example, the initial detailed geometry map could be a displacement map with zeros indicating updates to the initial 3D geometry 302. In some embodiments, the pre-processing module 232 may first compute, from the input 3D geometry 302, a vertex map and a normal map that serve as the starting points for determining the detailed geometry map as a displacement map during optimization. In such cases, updates to the input 3D geometry 302 (represented by the vertex map in texture space) are constrained to be along normals of the 3D geometry 302 (represented by the initial normal map) in small deltas (represented by the displacement map). In addition, in some embodiments, the pre-processing module 232 can generate per-camera texture maps that include the input images 300 and encode per-camera visibility. Further, in some embodiments, the pre-processing module 232 can determine per-camera weights that downweight less reliable data based on high foreshortening of camera view and defocus from a shallow depth of view. As described in greater detail below, in some embodiments, the pre-computed geometry and shadow maps can be used in an inverse rendering to render a face, and the per-camera weights can be applied to the rendering error, where the inverse-rendered image is compared to a real captured image.

Given the initial appearance maps (and the other inputs described above), the optimization module 234 performs non-linear least squares optimization, beginning with the initial appearance maps and the initial detailed geometry map generated by the pre-processing module 232, to determine appearance maps and a detailed geometry map that can be used to render images matching images captured by the cross-polarized cameras 110 and the cameras that are not cross-polarized 112. During such an optimization, rendered images that include only color but not highlights (i.e., specular information) are compared to images captured by the cross-polarized cameras 110, while rendered images that include both color and highlights are compared to images captured by the cameras that are not cross-polarized 112. Such an optimization procedure is also referred to herein as "inverse rendering." As described, images captured by the cross-polarized cameras 110 include color but not highlights, while images captured by the cameras that are not cross-polarized 112 include both color and highlights. Accordingly, images captured by the cross-polarized cameras 110 are useful for determining appearance properties other than specular intensity and specular lobe, such as diffuse albedo, while images captured by the cameras that are not cross-polarized 112 are useful for determining appearance properties including specular intensity and specular lobe.

In some embodiments, the optimization module 234 performs a coarse-to-fine optimization to determine optimized appearance and detailed geometry maps at increasingly highly resolutions, until an original resolution of the images captured by the cameras 110 and 112 is reached, as discussed in greater detail below in conjunction with FIGS. 5-6. Such a coarse-to-fine optimization permits various details of the appearance and detailed geometry maps to be determined at different resolutions.

In some embodiments, the optimization for computing appearance and detailed geometry maps can operate in the UV texture-space using initial geometry maps for the initial 3D geometry 302, described above, and self-calibrated textures containing image data captured by the cameras 110 and 112. More formally, the output of optimization is a multi-channel map $\Theta(x_u, x_v)$ encoding per-texel RGB albedo, specular intensity and lobe size, and a displacement map representing detailed geometry. For each texel x, these parameters are encoded in a vector of unknowns $\Theta_x = \{\rho_r, \rho_g, \rho_b, \rho_s, \alpha, d\} \in \mathbb{R}^6$. In some embodiments, the lighting (e.g., lighting produced by light sources 102, 104, 106, and 108) may be soft, making estimating per-texel specular lobe sizes an ill-posed problem. In such cases, the lobe size $\alpha$ can be fixed as the size estimated during self calibration $\alpha = \alpha_0$. In addition, spatial variation in skin roughness (e.g., due to skin stretching) is partially captured in the specular intensity and displacement maps that are computed.

To compute the optimal parameter map $\Theta$, the optimization module 234 includes an auto-differentiable renderer that seeks to match input image data $l_c(x)$ as closely as possible, i.e., to perform inverse rendering. In some embodiments, the matching can be achieved by minimizing the energy (loss) term $$E_{img}(\Theta_X) = \Sigma_x \Sigma_c W_c(x) \|I_c(x) - L_o(x,\omega_c)\|_2^2, \quad (1)$$

where the rendered texel colors $L_o(\cdot)$ are given by a bidirectional scattering-surface reflectance distribution function (BSSRDF), and $W_c$ are precomputed per-camera weight maps, described above, that can be used to provide a measure of confidence in the data due to defocus and view foreshortening. In some embodiments, the BSSRDF is of the form $$L_o(x_o,\omega_o) = \Sigma_A \Sigma_\Omega S(x_o,\omega_o,x_i,\omega_i) L_i(x_i,\omega_i)(n_i^T \omega_i) \Delta \omega_i A_i \quad (2)$$

for unoccluded directions $\omega_i \in \Omega$ with solid angle $\Delta \omega_i$ and nearby patches $x_i \in A$ with area $\Delta A_i$, where $x_i$ is the position of a surface patch with normal $n_i$, and $L_i(x_i, \omega_i)$ is the incident light from direction $w_i$. In the BSSRDF of equation (2), $S(x_o, \omega_o, x_i, \omega_i)$ includes two components that define the surface (specular) and subsurface (diffuse) contributions to reflected light:

$$S(x_o,\omega_o,x_i,\omega_i) = \delta_{ij} S_r(x_o,\omega_o,\omega_i) + S_d(x_o,\omega_o,x_i,\omega_i), \quad (3)$$

where the Kronecker delta $\delta_{ij} = 1$ if $x_i = x_o$. When rendering cross-polarized views, the surface reflectance in equation (3) can be modeled as $S_r(x_o, \omega_o, \omega_i) = 0$. For parallel-polarized views, the surface reflectance in equation (3) can be modeled using the Cook-Torrance bidirectional reflectance distribution function (BRDF):

$$S_\gamma(x_o, \omega_o, \omega_i) = \rho_s(x_o) \frac{D(\omega_o, \rho_i, n_o, \alpha) G(\omega_o, \omega_i) F(\eta, \omega_0, \omega_1)}{4(n_o^T \omega_i)(n_o^T \omega_o)}, \quad (4)$$

which is modulated by the spatially varying specular intensity parameter $\rho_s$ that captures variability in skin reflectance due to, e.g., surface oiliness. In equation (3), G is the standard geometry attenuation term, F denotes the Fresnel curve, and the index of refraction can be fixed at $\eta = 1.4$. In some embodiments, the Fresnel curve F is used for parallel-polarized light, rather than unpolarized light that the Fresnel curve is typically used for, when horizontal polarizers are used on light sources to produce predominantly parallel polarized reflection on a face along the equatorial directions. The distribution term D in equation (5) can be $D(\cdot) = \alpha D_{12}(\cdot) + (1-\alpha) D_{48}(\cdot)$, which is a linear combination of two Blinn-Phong basis lobes with exponents 12 and 48. Returning to equation (3), the diffuse reflection term $S_d$, which accounts for subsurface scattering and absorption of light for the given color channel wavelength $\lambda$, can be computed as $$S_d(\cdot) = \frac{1}{\pi} F_t(x_o, \omega_o) \rho_\lambda(x_o) R_\lambda(\|x_o - x_i\|_2) \rho_\lambda(x_i) F_t(x_i, \omega_i), \quad (5)$$

where $F_t$ is the Fresnel transmittance, $\rho_\lambda$ is the (red, green, or blue) spatially-varying albedo, and $R_\lambda(r)$ is a sum-of-Gaussians diffusion profile. In some embodiments, the optimization module 234 uses diffusion profiles that are relative to the typical diffusion observed for a blue wavelength. In addition, per-channel Gaussian weights can be fixed as computed to approximate a three-layer skin model.

As described, subsurface scattering needs to be accounted for to, among other things, avoid blurry normal and albedo estimates with attenuated high-frequency detail. By accounting for subsurface scattering, the albedo and normal maps will have sharper details that are blurred during rendering to look like skin. To improve the level of recovered surface detail, the approach described above focuses on data from surface (specular) reflectance. As described, specular reflection maintains light polarization, so the cameras that are not cross-polarized 112 filter out half of the diffuse reflection and effectively increase the specular-to-diffuse reflection ratio. However, the specular signal under a single illumination condition may not be enough to fully disambiguate normal estimation. The fact that subsurface scattering is significantly lower in the blue image channel can be leveraged to solve this problem by estimating fine-scale detail using predominantly specular and blue-diffuse constraints. In some embodiments, the optimization module 234 can use diffusion profiles that are relative to the typical diffusion observed for a blue wavelength, as described above. To further constrain the estimation of normals, integrability (zero curl) can be enforced as a hard constraint in the geometry model. In such a case, the refined normal field is parameterized in terms of a displacement map d(u, v) that is optimized for from the outset and can be trivially applied to emboss fine-detailed geometry onto an initial fitted template face mesh that is used as the initial geometry 302. More formally, given the input vertex and normal maps of the template face mesh, let $\hat{n}$, $\hat{t}_u$, and $\hat{t}_v$ denote a texel's unit normal and tangent vectors (computed by simple finite differences). In addition, let $\hat{s}_u$ and $\hat{s}_v$ be the original lengths of the tangent vectors encoding texel size. Then, after applying the high-level displacement map d(u, v), the non-unit normal of the new, refined mesh can be expressed from the new, non-unit tangents as $$n = (\hat{s}_u \hat{t}_u + d_u \hat{n}) \times (\hat{s}_v \hat{t}_v + d_v \hat{n}) \quad (6)$$

$$= [\hat{t}_u \, \hat{t}_v \, \hat{n}] \begin{bmatrix} \hat{s}_v & 0 & 0 \\ 0 & \hat{s}_v & 0 \\ 0 & 0 & \hat{s}_u \hat{s}_v \end{bmatrix} \begin{bmatrix} -d_u \\ -d_v \\ 1 \end{bmatrix}, \quad (7)$$

where $d_u$ and $d_v$ are the partial derivatives of d(u, v) computed via finite differencing. The simple form in equation (6) is achieved by leveraging the fact that a triangle in the initial template mesh (i.e., the initial geometry) spans multiple texels in its normal map, resulting in locally constant $\hat{n}$. In addition, equation (6) properly accounts for texel size, which improves scaling of constraints and allows for optimization in a coarse-to-fine, multi-resolution manner for better convergence.

Returning to the energy term of equation (1) that is minimized to match rendered images to input image data $I_c(x)$ as closely as possible, the data terms in equation (1) may not be sufficient to completely constrain all parameters of all texels. In some embodiments, the optimization module 234 can use additional regularization constraints to disambiguate parameter estimation in small regions of the face. In such cases, the overall energy term minimized during optimization can be $$\min_{\Theta} E_{img}(\Theta_X) + \lambda_1 \|d - d_0\|_F^2 + \quad (8)$$

-continued
$$\lambda_2 \|\nabla d\|_F^2 + \lambda_3 \|\rho_s - \rho_{s0}\|_F^2 + \lambda_4 \|\nabla \rho_s\|_F^2.$$

In equation (8), a detailed displacement map is weakly constrained to be close to the initial geometry map, $d_0(u,v)$, as the detailed displacement map only updates mid- and high-frequency geometry components of the template face mesh ($\lambda_1$=0.03). A small 3×3 Laplacian operator can also be applied to ensure smoothness in underconstrained regions of the face ($\lambda_2$=0.02). Similarly, in equation (8), specular intensity is regularized towards the global, self-calibrated value in $\rho_{s0}$ in underconstrained regions where specular reflection is very weak ($\lambda_3$=0.03), which can include extreme sides of the face where there is no illumination from behind, underneath the jaw, and in concave regions where multiple indirect bounces of light are not accounted for. Initially, a strong Laplacian operator can be applied to smooth the specular intensity map ($\lambda_4$=0.03), which forces fine-detailed surface geometry to be represented mostly by the displacement map. Upon convergence during optimization, the geometry map can be fixed and optimization continued with disabled Laplacians, allowing specular intensity to also model sharp specular reflection occlusion effects that were not explained by the optimized geometry. In addition, to compute displacement maps with stronger mid-frequency (e.g., deeper skin wrinkles and creases, larger moles, etc.), appearance and geometry optimization can be performed in the coarse-to-fine manner described above, with results first computed at lower resolutions and then used to initialize optimization at higher resolutions. As described, the coarse-to-fine optimization permits different details to be determined at different resolutions. At each increasing resolution, the appearance and detailed geometry maps are closer to final, optimized maps, and the optimization converges faster due to the initialization using the appearance and detailed geometry maps determined at a previous resolution. For example, optimization could begin at 2K×2K resolution and end with 4K or 8K maps, using a 2× upsampling factor that doubles the resolution at every iteration of the coarse-to-fine optimization. In some embodiments, the optimization module 234 can use the non-linear ceres solver to during the optimization.

As described, calibration is required before the optimization module 234 computes appearance and geometry refinement, in order to account for differences in color space (exposure, black level) and polarization filter attenuation amongst the cross-polarized cameras 110 and the cameras that are not cross-polarized 112. In some embodiments, the pre-processing module 232 performs calibration using (1) one of the cross-polarized cameras 110 as a calibration target for calibrating the other cross-polarized cameras 110, and (2) a rendering of the face captured by one of the cameras that is not cross-polarized 112 as the calibration target for calibrating the other cameras that are not cross-polarized 112.

It should be understood that color calibration using a standard color chart can oftentimes be misled by specular reflection when both view and light directions are at an oblique angle. In addition, properly measuring the per-camera attenuation of image intensity due to the use of polarization filters can be difficult and laborious. As described, some embodiments employ automated self calibration, using the captured face itself along with renderings as the calibration target, to facilitate use of the camera system 100. In such cases, only one of the cross-polarized cameras needs to be color calibrated towards a color chart to provide a reference color space that will be matched by the other cross-polarized cameras 110. For example, the cross-polarized camera 110 in front of the face could be taken as the reference, and pre-processing module 232 could calibrate each of the other cross-polarized cameras 110 to match the colors of the frontal cross-polarized camera 110, by estimating a 3×4 affine color matrix in the least-squares sense. The other eight cameras 110, which are parallel polarized, may exhibit strongly view-dependent specular reflection. To calibrate the cameras that are not cross-polarized 112, the pre-processing module 232 can generate an initial rendering based on the appearance model described above, and use the rendering as the calibration target. Doing so ensures that each of the cameras that are not cross-polarized 112 agrees with the appearance model as closely as possible. More specifically, given the initial geometry of a template face mesh, for each of the parallel-polarized cameras c, the pre-processing module can render two specular reflection images, $S_{c_1}(x)$ and $S_{c_2}(x)$, one for each of the specular basis lobes in the BRDF described above, using a diffuse term $I_{xp}(x)$ that is the image of the closest cross-polarized camera. In such a case, the self calibration procedure for each parallel-polarized camera image $I_c(x)$ can estimate a camera color matrix $M_c$ satisfying $$M_C \begin{bmatrix} I_c(x) \\ 1 \end{bmatrix} \approx [S_{c_1}(x) \, S_{c_2}(x) \, I_{xp}(x)] \begin{bmatrix} w_1 \\ w_2 \\ 1 \end{bmatrix}, \forall c, \forall x. \quad (9)$$

In equation (9), the specular weights $w_1>0$ and $w_2>0$ are related to the BRDF parameters in equation (3). In particular, the specular intensity is $\rho_s=w_1+w_2$ and the specular lobe size is $\alpha=w_1/(w_1+w_2)$. As described, the weights $w_1$ and $w_2$, which are not initially known, can be (globally) estimated in addition to the eight matrices $M_c$ via an alternated least squares technique. In such cases, the weights $w_1$ and $w_2$ can be initialized using known measurements of facial skin reflectance. In addition, as a by-product of self calibration, the pre-processing module 232 can compute global estimates $\rho_{s0}$ and $\alpha_0$ that can be used to regularize per-texel estimates in the optimization performed by the optimization module 234, described above.

As shown in FIG. 3, the appearance capture application 230 outputs a diffuse albedo map 304, a specular map 306, and a detailed geometry map 308 that is a displacement map. In some embodiments, the appearance capture application 230 can also output global parameters for the two-lobe specular BRDF model, described above, that can be used to render images of a face. Each of the maps 304, 306, and 308 can be generated by the optimization module 234 according to techniques described above. Although described herein primarily with respect to particular appearance and detailed geometry maps as reference examples, in other embodiments, any technically feasible appearance and/or geometry maps, such as global specular roughness maps, may be generated using techniques disclosed herein.

Figure 4:
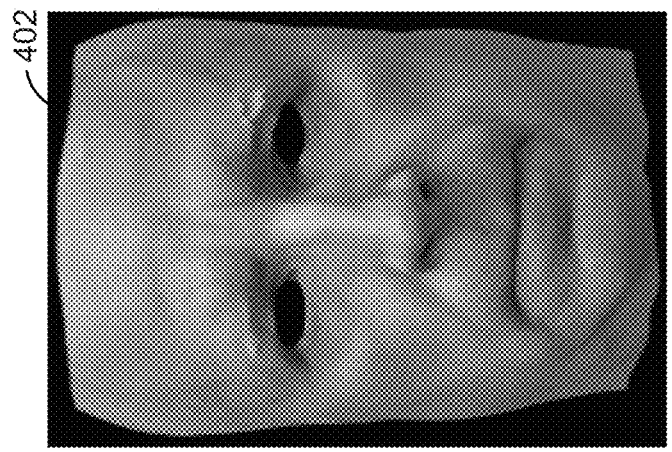
FIG. 4 illustrates exemplar digital faces rendered using the initial 3D geometry and the appearance and detailed geometry maps of FIG. 3, according to various embodiments.
Figure 4:
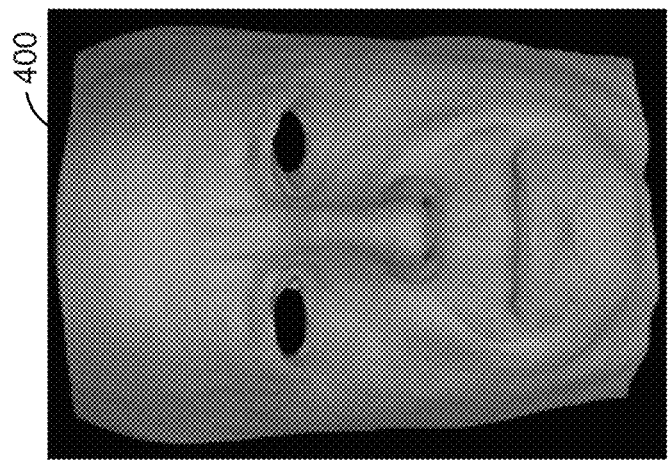

FIG. 4 illustrates exemplar digital faces rendered using the initial 3D geometry 302 and the appearance and detailed geometry maps 304, 306, and 308 of FIG. 3, according to various embodiments. As shown, a digital face 400 has been rendered using the initial geometry 302, the diffuse albedo map 304, the specular map 306, and the detailed geometry map 308. Illustratively, the digital face 400 closely matches one of the original images 300 captured by the cameras 110 and 112.

Another digital face 402 has been rendered using the same initial geometry 302, the diffuse albedo map 304, the specular map 306, and the detailed geometry map 308 under different lighting conditions. More generally, faces captured in one lighting environment according to techniques disclosed herein can be rendered in other lighting environments. Experience has shown that such renderings in other lighting environments appear realistic and closely match images of faces captured in those lighting environments.

Although faces with neutral expressions are shown in FIGS. 3-4 as reference examples, techniques disclosed herein can be used to capture faces with any expressions, such as smiling, frowning, etc. In addition, using synchronized cross-polarized cameras 110 and cameras that are not cross-polarized 112, a video can be captured and thereafter used in dynamic, video-based facial capture. Each frame in such a video includes images captured by the cross-polarized cameras 110 and the cameras that are not cross-polarized 112 during the same period of time lasting, e.g., a few milliseconds, which can be used to capture a face depicted in the frame according to techniques disclosed herein.

Face Capture Techniques

Figure 5:
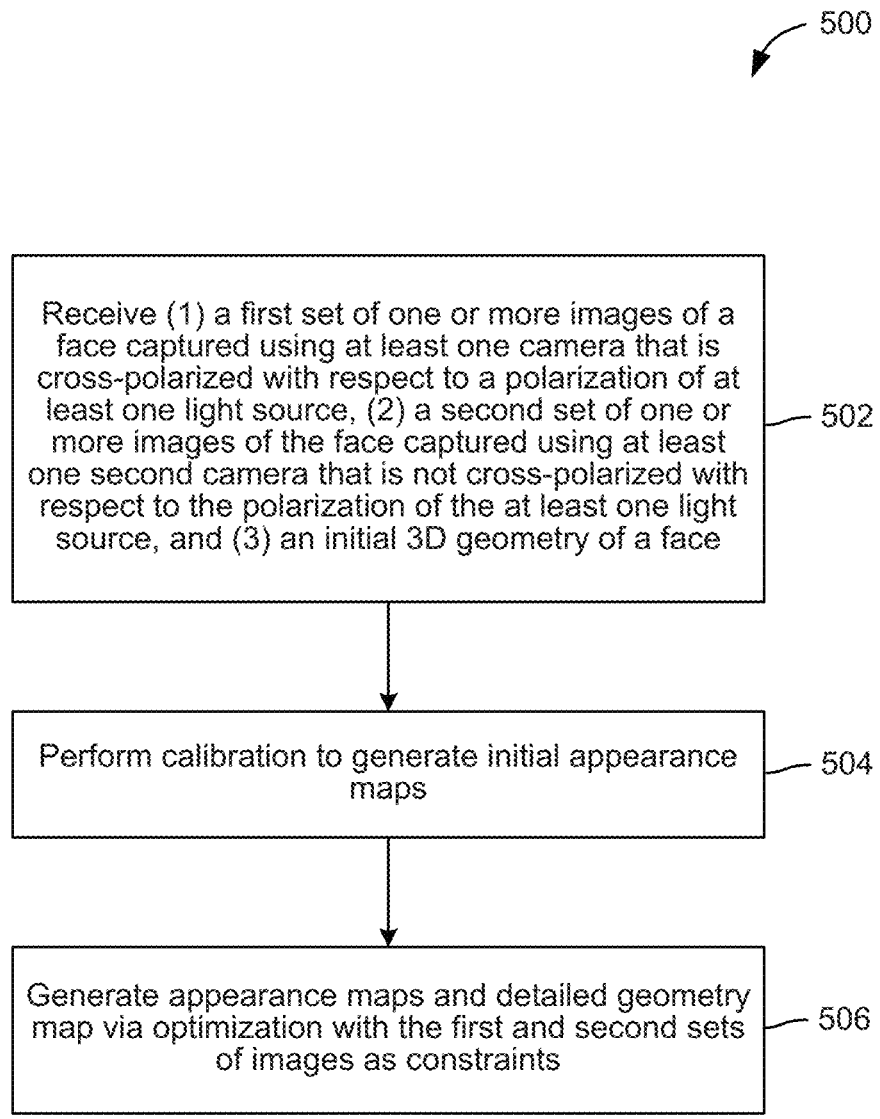
FIG. 5 sets forth a flow diagram of method steps for facial appearance capture, according to various embodiments.

FIG. 5 sets forth a flow diagram of method steps for facial appearance capture, according to various embodiments. Although the method steps are described in conjunction with the systems of FIG. 1-3, persons of ordinary skill in the art will understand that any system configured to perform the method steps, in any order, is within the scope of the present disclosure. Although a method 500 is shown for capturing facial appearance properties from a single shot, steps of the method 500 can be repeated for multiple frames of a video to enable dynamic facial appearance capture.

As shown, the method 500 begins at step 502, where the appearance capture application 230 receives (1) a first set of one or more images of a face captured using at least one camera that is cross-polarized with respect to a polarization of at least one light source, (2) a second set of one or more images of the face captured using at least one second camera that is not cross-polarized with respect to the polarization of the at least one light source, and (3) an initial 3D geometry of a face. The images can be captured using any technically feasible configuration of at least one cross-polarized camera and at least one camera that is not cross-polarized, such as the configuration of the camera system 100 described above in conjunction with FIG. 1. In addition, the initial 3D geometry can be generated in any technically feasible manner, including based on the same images captured using the cross-polarized cameras and the cameras that are not cross-polarized. In some embodiments, the initial 3D geometry can be represented in 2D, such as using a displacement map defined in UV texture space.

At step 504, the appearance capture application 230 performs calibration to generate initial appearance maps. As described, the appearance capture application 230 can perform self calibration in some embodiments, in which (1) one of the cross-polarized cameras 110 is used as a calibration target for calibrating the other cross-polarized cameras 110, and (2) a rendering of the face captured by one of the cameras that are not cross-polarized is used as the calibration target for calibrating the other cameras that are not cross-polarized 112. Such a self calibration can be used to determine color-exposure correction matrices for each camera and initial albedo maps. Initial specular intensity maps can be set to 0 or a typical specular intensity associated with faces. In some embodiment, the appearance capture application 230 can also perform other pre-processing operations, such as determining the environment map, initial detailed geometry in the form of a displacement map, shadow maps, per camera texture maps, and per-camera weights that downweight less reliable data, as described above in conjunction with FIG. 3.

At step 506, the appearance capture application 230 generates appearance maps and a detailed geometry map via optimization, with the first and second sets of images being used as constraints during the optimization. In some embodiments, the appearance capture application 230 performs non-linear least squares optimization at one or more resolutions to determine the appearance and detailed geometry maps, starting from the initial appearance maps generated at step 504. As described, images captured by the cross-polarized cameras 110, which do not include specular highlights, are useful for determining appearance properties other than specular intensity and specular lobe during optimization, while images captured by the cameras that are not cross-polarized 112, which do include specular highlights, are useful for determining appearance properties including specular intensity and specular lobe during the optimization. In addition, the optimization can include inverse rendering to match rendered images of a face to the captured images of the face. In particular, in some embodiments, pre-computed geometry and shadow maps can be used in the inverse rendering to render a face, and the per-camera weights can be applied to the rendering error, where the inverse-rendered image is compared to a real captured image.

Subsequent to optimization, images of a digital face can be rendered using the initial 3D geometry and the appearance and detailed geometry maps generated by the appearance capture application 230. In some embodiments, the appearance capture application 230 also outputs global parameters for the two-lobe specular BRDF model, described above, which can also be used during the rendering of images.

Figure 6:
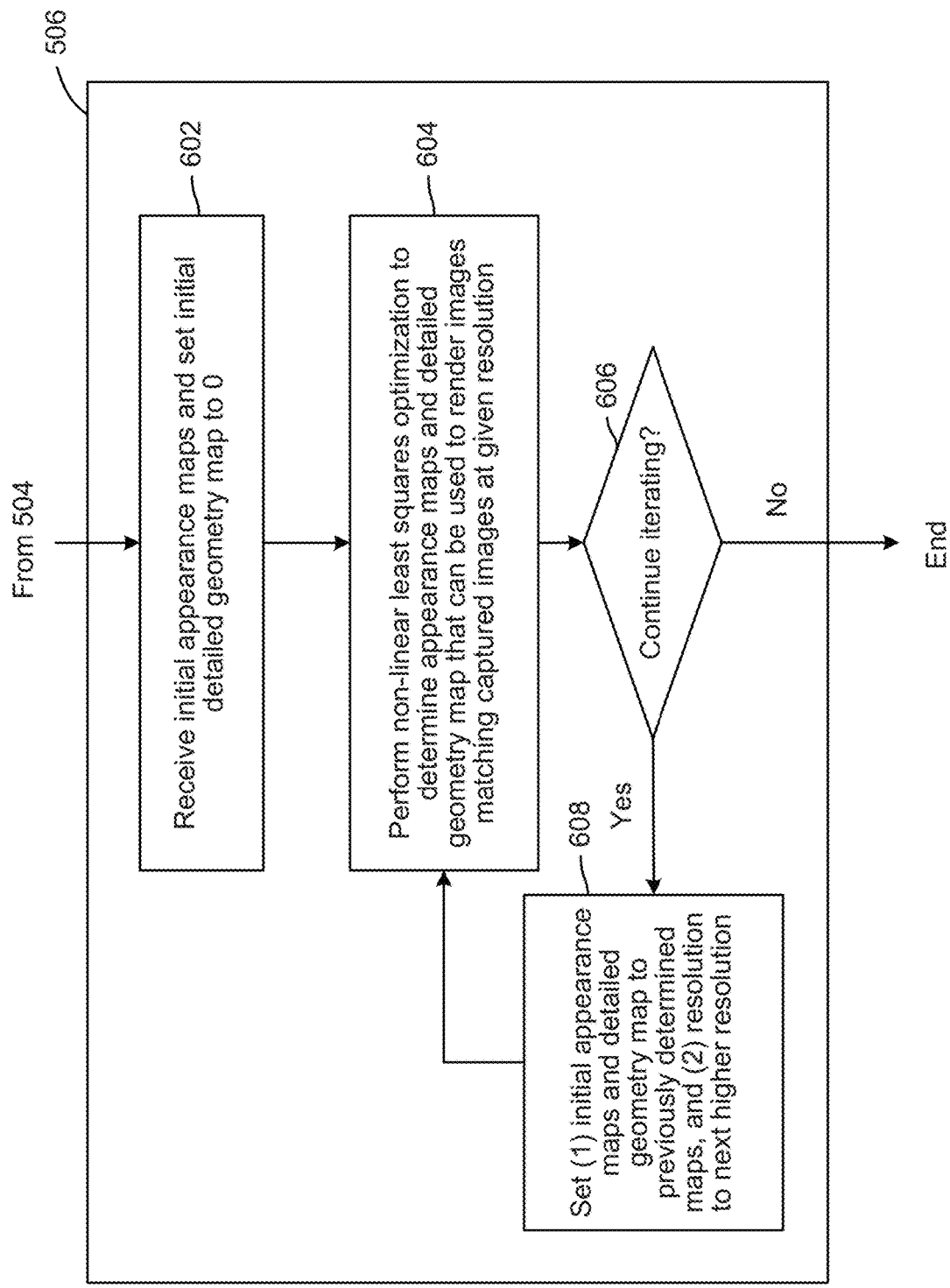
FIG. 6 is a more detailed illustration of one of the steps of FIG. 5, according to various embodiments.

FIG. 6 illustrates in greater detail step 506 of FIG. 5, according to various embodiments. Although the method steps are described in conjunction with the systems of FIG. 1-3, persons of ordinary skill in the art will understand that any system configured to perform the method steps, in any order, is within the scope of the present disclosure.

As shown, at step 602, the appearance capture application 230 receives the initial appearance maps determined at step 504 and sets the initial detailed geometry map to 0. As described, the initial appearance maps can include albedo maps determined via self calibration using images captured by the cross-polarized cameras 110 and the cameras that are not cross-polarized 112. In addition, the initial appearance maps can include initial specular intensity maps set to 0 or a typical specular intensity associated with faces. In some embodiments, the appearance capture application 230 may first compute, from input 3D geometry, a vertex map and a normal map that serve as the starting points for determining the detailed geometry map as the displacement map during optimization. As described above in conjunction with FIG. 3, updates to the input 3D geometry (represented by the vertex map in texture space) are then constrained to be along normals of the 3D geometry (represented by the initial normal map) in small deltas (represented by the displacement map). After more than one iteration of optimization has been performed, the initial detailed geometry map can be a detailed geometry map generated during a previous iteration that used, along with other data (e.g., an environment map, shadow maps, per camera texture maps, and per-camera weights that downweight less reliable data), and in inverse rendering.

At step 604, the appearance capture application 230 performs a non-linear least squares optimization to determine appearance maps and a detailed geometry map that can be used to render images matching captured images at a given resolution. As described, coarse-to-fine optimization may be performed in some embodiments to determine optimized appearance maps at increasingly highly resolutions. In some embodiments, the appearance capture application 230 begins at a low resolution that is a fraction of the resolution of images captured by the cameras 110 and 112, and the appearance capture application 230 doubles the resolution at each iteration of the coarse-to-fine optimization, until the resolution of images captured by the cameras 110 and 112 is reached.

Any technically feasible non-linear least squares optimization can be performed at step 604. In some embodiments, the appearance capture application 230 performs gradient descent, with the initial appearance and detailed geometry maps as a starting point of the gradient descent. In such cases, the appearance capture application 230 may compute a loss function that is the squared difference between images captured by the cameras 110 and 112 and images rendered using the initial appearance and detailed geometry maps, compute a gradient that reduces the loss function, modify the appearance maps and a detailed geometry map based on the gradient, and repeat these steps until the difference between images captured by the cameras 110 and 112 and the rendered images is below a threshold. As described, in some embodiments pre-computed per-camera weights are also applied to the rendering error, where an inverse-rendered image is compared to a real captured image.

At step 606, the appearance capture application 230 determines whether to continue iterating. As described, in some embodiments, the appearance capture application 230 continues iterating until optimized appearance maps are determined at the resolution of images captured by the cameras 110 and 112.

If the appearance capture application 230 determines to stop iterating, then the method 500 ends. On the other hand, if the appearance capture application 230 determines to continue iterating, then the method 500 continues to step 608, where the appearance capture application 230 sets (1) initial appearance maps and a detailed geometry map for a next iteration to be the appearance and detailed geometry maps determined at step 604. Then, the method 500 returns to step 604, where the appearance capture application 230 performs non-linear least squares optimization again to determine appearance maps and a detailed geometry map that can be used to render images matching the captured images at the next higher resolution.

Although discussed herein primarily with respect to faces of humans, some embodiments may also be used to capture appearance properties of other types of faces, such as animal faces, or even objects other than faces, such as other body parts or other types of objects (e.g., fruits) that have both shininess and subsurface color.

In sum, techniques are disclosed for capturing facial appearance properties. In some embodiments, a facial capture system includes light source(s) that produce linearly polarized light, at least one camera that is cross-polarized with respect to the polarization of light produced by the light source(s), and at least one other camera that is not cross-polarized with respect to the polarization of the light produced by the light source(s). Images captured by the cross-polarized camera(s) are used to determine facial appearance properties other than specular intensity and specular lobe, such as diffuse albedo, while images captured by the camera(s) that are not cross-polarized are used to determine facial appearance properties including specular intensity and specular lobe. In addition, a coarse-to-fine optimization procedure is disclosed for determining appearance and detailed geometry maps based on images captured by the cross-polarized camera(s) and the camera(s) that are not cross-polarized.

At least one technical advantage of the disclosed techniques relative to the prior art is that the disclosed techniques can be used to generate high-quality appearance maps and detailed geometry maps, without requiring the specialized light stages and hundreds of lights typically associated with conventional facial capture systems. As a result, the disclosed technique provide ease of use and increased practical applicability relative to conventional facial capture systems. The disclosed techniques also permit single-shot capture, as opposed to multi-shot capture with strobed lighting, which reduces the discomfort to individuals whose faces are being captured. In addition, the disclosed techniques permit dynamic facial capture from videos. These technical advantages represent one or more technological improvements over prior art approaches.

1. In some embodiments, a computer-implemented method for generating one or more maps indicating surface properties of an object comprises receiving a first set of one or more images of the object captured using at least one first camera that is cross-polarized with respect to a polarization of at least one light source, receiving a second set of one or more images of the object captured using at least one second camera that is not cross-polarized with respect to the polarization of the at least one light source, receiving a three-dimensional (3D) geometry associated with the object, and generating at least one of an appearance map or a geometry map associated with the object based on the first set of one or more images, the second set of one or more images, and the 3D geometry.

2. The computer-implemented method of clause 1, wherein generating the at least one of the appearance map or the geometry map comprises performing one or more optimization operations for which the first set of one or more images and the second set of one or more images are used as constraints.

3. The computer-implemented method of clauses 1 or 2, wherein performing the one or more optimization operations comprises performing a plurality of optimization operations at different resolutions.

4. The computer-implemented method of any of clauses 1-3, wherein, for at least one resolution included in the different resolutions, a result at a previous resolution is used to initialize one or more optimization operations.

5. The computer-implemented method of any of clauses 1-4, wherein one or more first appearance maps are used to initialize the one or more optimization operations, the at least one first camera comprises a plurality of first cameras, the at least one second camera comprises a plurality of second cameras, and generating the one or more first appearance maps comprises calibrating the plurality of first cameras using one camera that is included in the plurality of first cameras, and calibrating the plurality of second cameras using a rendering of the object as a calibration target.

6. The computer-implemented method of any of clauses 1-5, wherein the at least one of the appearance map or the geometry map includes an appearance map that is one of a diffuse albedo map, a specular intensity map, or a specular roughness map.

7. The computer-implemented method of any of clauses 1-6, wherein the at least one of the appearance map or the geometry map includes a geometry map that is more detailed than the 3D geometry.

8. The computer-implemented method of any of clauses 1-7, wherein the 3D geometry comprises a displacement map defined in a UV texture space.

9. The computer-implemented method of any of clauses 1-8, wherein the at least one second camera is parallel-polarized with respect to the polarization of the at least one light source.

10. The computer-implemented method of any of clauses 1-9, wherein the object comprises a face.

11. In some embodiments, a camera system comprises at least one light source configured to generate light that is polarized, at least one first camera configured to capture light that is cross-polarized with respect to a polarization of the light generated by the at least one light source, and at least one second camera configured to capture light that is not cross-polarized with respect to the polarization of the light generated by the at least one light source.

12. The camera system of clause 11, wherein the at least one second camera captures light that is parallel-polarized with respect to the polarization of the light generated by the at least one light source.

13. The camera system of clauses 11 or 12, wherein the at least one first camera comprises a plurality of first cameras, and the at least one second camera comprises a plurality of pairs of second cameras.

14. The camera system of any of clauses 11-13, wherein the light generated by the at least one light source is substantially uniform.

15. The camera system of any of clauses 11-14, wherein the at least one light source comprises at least one light emitting diode (LED) or studio flash, and at least one linear polarization filter is disposed in front of the at least one LED or studio flash.

16. The camera system of any of clauses 11-15, further comprising at least one linear polarization filter disposed in front of the at least one first camera at an orientation that is orthogonal to the polarization of the light generated by the at least one light source.

17. The camera system of any of clauses 11-16, wherein the at least one first camera comprises a plurality of first cameras including a camera configured to capture a front of a face, a camera configured to capture a bottom of the face, a camera configured to capture a left side of the face, and a camera configured to capture a right side of the face, and the at least one second camera comprises a plurality of pairs of second cameras including a pair of second cameras configured to capture the front of the face, a pair of second cameras configured to capture the bottom of the face, a pair of second cameras configured to capture the left side of the face, and a pair of second cameras configured to capture the right side of the face.

18. In some embodiments, one or more non-transitory computer-readable storage media includes instructions that, when executed by one or more processors, cause the one or more processors to perform steps for generating one or more maps indicating surface properties of an object, the steps comprising receiving a first set of one or more images of the object captured using at least one first camera that is cross-polarized with respect to a polarization of at least one light source, receiving a second set of one or more images of the object captured using at least one second camera that is not cross-polarized with respect to the polarization of the at least one light source, receiving a three-dimensional (3D) geometry associated with the object, and generating at least one of an appearance map or a geometry map associated with the object based on the first set of one or more images, the second set of one or more images, and the 3D geometry.

19. The one or more non-transitory computer-readable storage media of clause 18, the steps further comprising rendering at least one image of the object based on the 3D geometry and the at least one of the appearance map or the geometry map.

20. The one or more non-transitory computer-readable storage media of clauses 18 or 19, wherein generating the at least one of the appearance map or the geometry map comprises performing one or more optimization operations for which the first set of one or more images and the second set of one or more images are used as constraints.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating one or more maps indicating surface properties of an object, the method comprising:
    receiving a first set of one or more images of the object captured using a first set of cameras that are cross-polarized with respect to a polarization of at least one light source;
    receiving a second set of one or more images of the object captured using a second set of cameras that are not cross-polarized with respect to the polarization of the at least one light source;
    receiving a three-dimensional (3D) geometry associated with the object;
    calibrating the first set of cameras using one camera that is included in the first set of cameras;
    calibrating the second set of second cameras using a rendering of the object as a calibration target;
    determining initial appearance maps associated with the object based on the calibrated first set of cameras and the calibrated second set of cameras; and
    generating at least one of an appearance map or a geometry map associated with the object based on the initial appearance maps, the first set of one or more images, the second set of one or more images, and the 3D geometry.

2. The computer-implemented method of claim 1, wherein generating the at least one of the appearance map or the geometry map comprises performing one or more optimization operations based on the initial appearance maps and for which the first set of one or more images and the second set of one or more images are used as constraints.

3. The computer-implemented method of claim 2, wherein performing the one or more optimization operations comprises performing a plurality of optimization operations at different resolutions.

4. The computer-implemented method of claim 3, wherein, for at least one resolution included in the different resolutions, a result at a previous resolution is used to initialize one or more optimization operations.

5. The computer-implemented method of claim 2, wherein the one or more optimization operations comprise a non-linear least squares optimization.

6. The computer-implemented method of claim 1, wherein generating the at least one of the appearance map or the geometry map comprises generating the appearance map, and wherein the appearance map comprises a diffuse albedo map, a specular intensity map, or a specular roughness map.

7. The computer-implemented method of claim 1, wherein generating the at least one of the appearance map or the geometry map comprises generating the geometry map, and wherein the geometry map is more detailed than the 3D geometry associated with the object.

8. The computer-implemented method of claim 1, wherein the 3D geometry comprises a displacement map defined in a UV texture space.

9. The computer-implemented method of claim 1, wherein at least one camera included in the second set of cameras is parallel-polarized with respect to the polarization of the at least one light source.

10. The computer-implemented method of claim 1, wherein the object comprises a face.

11. A system, comprising:
at least one light source configured to generate light that is polarized;
a first set of cameras configured to capture light that is cross-polarized with respect to a polarization of the light generated by the at least one light source;
a second set of cameras configured to capture light that is not cross-polarized with respect to the polarization of the light generated by the at least one light source; and
an appearance capture application that, during operation:
receives a first set of one or more images of an object captured using the first set of cameras;
receives a second set of one or more images of the object captured using the second set of cameras;
receives a three-dimensional (3D) geometry associated with the object;
calibrates the first set of cameras using one camera that is included in the first set of cameras;
calibrates the second set of cameras using a rendering of the object as a calibration target;
determines initial appearance maps associated with the object based on the calibrated first set of cameras and the calibrated second set of cameras;
and
generates at least one of an appearance map or a geometry map associated with the object based on the initial appearance maps, the first set of one or more images, the second set of one or more images, and the 3D geometry.

12. The system of claim 11, wherein the second set of cameras is configured to capture light that is parallel-polarized with respect to the polarization of the light generated by the at least one light source.

13. The system of claim 11, wherein the light generated by the at least one light source is substantially uniform.

14. The system of claim 11, wherein the at least one light source comprises at least one light emitting diode (LED) or studio flash, and at least one linear polarization filter is disposed in front of the at least one LED or studio flash.

15. The system of claim 11, further comprising at least one linear polarization filter disposed in front of at least one camera included in the first set of cameras at an orientation that is orthogonal to the polarization of the light generated by the at least one light source.

16. The system of claim 11, wherein:
the first set of cameras comprises a plurality of first cameras including a camera configured to capture a front of a face, a camera configured to capture a bottom of the face, a camera configured to capture a left side of the face, and a camera configured to capture a right side of the face; and
the second set of cameras comprises a plurality of pairs of second cameras including a pair of second cameras configured to capture the front of the face, a pair of second cameras configured to capture the bottom of the face, a pair of second cameras configured to capture the left side of the face, and a pair of second cameras configured to capture the right side of the face.

17. One or more non-transitory computer-readable storage media including instructions that, when executed by one or more processors, cause the one or more processors to perform steps for generating one or more maps indicating surface properties of an object, the steps comprising:
receiving a first set of one or more images of the object captured using a first set of cameras that are cross-polarized with respect to a polarization of at least one light source;
receiving a second set of one or more images of the object captured using a second set of cameras that are not cross-polarized with respect to the polarization of the at least one light source;
receiving a three-dimensional (3D) geometry associated with the object;
calibrating the first set of cameras using one camera that is included in the first set of cameras;
calibrating the second set of second cameras using a rendering of the object as a calibration target;
determining initial appearance maps associated with the object based on the calibrated first set of cameras and the calibrated second set of cameras;
and
generating at least one of an appearance map or a geometry map associated with the object based on the initial appearance maps, the first set of one or more images, the second set of one or more images, and the 3D geometry.

18. The one or more non-transitory computer-readable storage media of claim 17, wherein the instructions, when executed by the one or more processors, cause the one or more processors to perform the steps further comprising rendering at least one image of the object based on the 3D geometry and the at least one of the appearance map or the geometry map.

19. The one or more non-transitory computer-readable storage media of claim 17, wherein generating the at least one of the appearance map or the geometry map comprises performing one or more optimization operations for which the first set of one or more images and the second set of one or more images are used as constraints.

* * * * *